H. A. & R. BARNARD.
PRUNING IMPLEMENT.
APPLICATION FILED MAR. 19, 1908.
928,018.
Patented July 13, 1909.
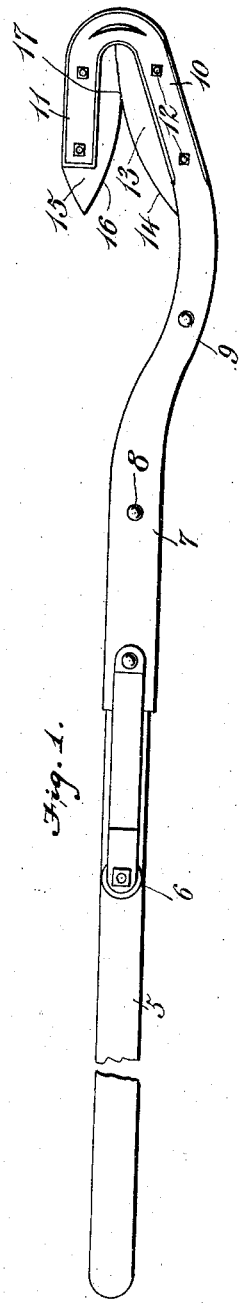

UNITED STATES PATENT OFFICE.

HENRY A. BARNARD AND ROMA BARNARD, OF PLATTSBURG, NEW YORK, ASSIGNORS OF ONE-THIRD TO JOHN B. DEMARY, OF PLATTSBURG, NEW YORK.

PRUNING IMPLEMENT.

No. 928,018.      Specification of Letters Patent.      Patented July 13, 1909.

Application filed March 19, 1908. Serial No. 422,188.

*To all whom it may concern:*

Be it known that we, HENRY A. BARNARD and ROMA BARNARD, citizens of the United States, residing at Plattsburg, in the county of Clinton and State of New York, have invented certain new and useful Improvements in Pruning Implements, of which the following is a specification.

This invention relates to that class of pruning-implements characterized by a cutter or knife having the shape of a hook, and it has for its object to provide an implement of this kind in which the cutter consists of two blades which are arranged so as to form the hook-shaped cutter, and which are secured in such a manner that either one may be removed if broken or damaged.

A further object of the invention is to provide for an adjustment of the blades to different angles.

In the accompanying drawing, Figure 1 is a plan view of the invention, and Fig. 2 is an edge view thereof. Fig. 3 is a plan view of the blades removed.

Referring specifically to the drawing, 5 denotes the handle of the implement, which may be of any suitable length, and is provided with a hand-grip 6 secured so as to be reversible for either the right or the left hand.

To the outer end of the handle is secured a hook-shaped shank to which the blades of the cutter or knife are secured. This shank comprises two plates 7 which are secured to the handle on opposite sides thereof by bolts 8 or in any other suitable manner. Beyond the end of the handle the plates are bent laterally slightly as indicated at 9, and then a bend is made to form the shank 10 and the bill 11 of a hook. Between the plates forming the parts 10 is secured by bolts 12 a cutter-blade 13 having a curved cutting edge 14. A cutter-blade 15 is secured in a like manner to the plates forming the part 11. This blade also has a curved cutting edge 16.

When the two blades are in position on the hook, the cutting edges 14 and 16 lie within the hook and are opposite each other, and they converge rearwardly and come together as indicated at 17 as clearly shown in Fig. 1, thus forming a substantially V shaped recess. By making the cutting edges curved as shown, the implement will cut easily, and also will make a clean cut instead of having a tendency to break off the limb or other part to be severed.

The blades are secured independently to the hook so that either one may be removed if broken or damaged. The bolts which fasten the two blades to the hook pass through slots 18 in the blades, which enables them to be set to different angles.

The implement herein described is simple in construction and therefore can be cheaply produced, it can be readily kept in good working order, and it is efficient in action.

We claim:

A pruning implement comprising a handle, a pair of spaced plates secured to opposite sides thereof and projecting from one end thereof, the outer ends of the plates having the shape of a hook and offset to bring the hook substantially in line with the handle, a pair of fixed cutting blades between the hook-shaped portion of the plates and having slots near the opposite ends thereof and bolts for fastening said blades passing through the plates and through the slots in the blades, whereby the distance and angle between the cutting edges can be varied, said blades having curved cutting edges inclined toward each other.

In testimony whereof we affix our signatures, in presence of two witnesses.

HENRY A. BARNARD.
            ROMA BARNARD.

Witnesses:
    HENRY H. PARMUTER,
    GEO. F. JAMES.